United States Patent [19]

Walse et al.

[11] 3,921,769

[45] Nov. 25, 1975

[54] EXPLOSION-PROOF ELECTRICAL CABLE REEL CONNECTOR

[75] Inventors: Alan S. Walse, La Grange; Donald J. Reed, Downers Grove, both of Ill.

[73] Assignee: Akzona Inc., Asheville, N.C.

[22] Filed: July 17, 1974

[21] Appl. No.: 489,242

[52] U.S. Cl............ 191/12 R; 339/111; 191/12.2 R
[51] Int. Cl.² ......................................... H02G 11/00
[58] Field of Search......... 191/12.2 R, 12.2 A, 12.4, 191/12 R; 339/111, 119 C, 147 C, 157 C

[56] References Cited
UNITED STATES PATENTS

| | | | |
|---|---|---|---|
| 2,802,998 | 8/1957 | Baver | 339/111 |
| 3,374,319 | 3/1968 | Stahmer | 191/12.4 |

Primary Examiner—M. Henson Wood, Jr.
Assistant Examiner—D. W. Keen
Attorney, Agent, or Firm—Hill, Gross, Simpson, Van Santen, Steadman, Chiara & Simpson

[57] ABSTRACT

An explosion-proof electrical cable reel connector has plug and receptacle housing sections detachably secured together in explosion-proof relationship and the receptacle housing section has a mating curved surface mechanically attached to the outside curvature of the drum. The receptacle housing section contains a plurality of plug electrical connectors operable to slidably engage the receptacle electrical connectors of the plug housing section thereby forming an electrical connection. The energizing cable enters the plug section through a packing gland at an angle to permit the cable to accept the natural lay or wrap of cable around the reeling means.

10 Claims, 8 Drawing Figures

EXPLOSION-PROOF ELECTRICAL CABLE REEL CONNECTOR

BACKGROUND OF THE INVENTION

1. Field of the Invention

This invention relates to an explosion-proof electrical cable reel connector.

2. Prior Art

Take-up reels are rotatable mechanical devices utilized on various moving machinery such as shuttle cars and like apparatus used typically in an underground mining operation to wind and unwind cords, hoses or electrical cables as the machinery moves forward and backward, thereby preventing damage or destruction of the cable, etc. from the continuous passing of the vehicle over the cord, hose or electrical cable.

An electrical cable is generally terminated at a take-up reel by passing the cable through an entrance in the drum-shaped surface of the take-up reel, wherein the leads of the cable are electrically connected to a set of slip-rings operable to transfer electrical power to the vehicle while permitting the rotational movement of the drum. Because such a system is generally required or utilized in a mining environment, i.e., in confined areas subject to explosive gases, any electrical connections must meet the stringent safety requirements of the Bureau of Mining Standards. Thus, all connections must be explosion-proof, provide for the personal safety of all workers, and must be sealed to the adverse effects of water and moisture.

In one form of prior art, a strain-relief clamp is utilized to force the cable at the point of entrance into the drum to accept the natural curvature of the reel take-up.

The problem or disadvantage with such prior art is that in order to comply with safety requirements, the electrical connection is sealed in such an involved and complicated manner that it requires the maintenance or replacement of the cable to be done within the confines of the take-up reel itself. This necessitates a rather lengthy, time-consuming routine every time the cable requires inspection or replacement due to wear and deterioration.

SUMMARY OF THE INVENTION

The above disadvantages of the prior art are overcome in the present invention by providing plug and receptacle housing sections wherein the receptacle housing section has a mating curved surface, mechanically attached to the outside curvature of the drum of the cable reeling means. A plurality of leads are mechanically attached to a like number of plug connectors within the receptacle section and exit therefrom through packing glands to a slip-ring means located within the drum of the cable reeling means. A plug section having an insulated contact insert with a plurality of receptacle connectors connected to the plurality of leads of an energizing cable is detachably secured to the receptacle section in an explosion-proof relationship. The energizing cable enters the plug section through a packing gland at an angle to permit the cable to accept the natural lay or wrap of cable around the cable reeling means, thereby acting in conjunction with the mechanical attachment of the receptacle housing section to the cable reeling means, as a strain-relief means. The insulated contact insert is held in place within the plug section by a mating cover detachably mounted to the plug section in an explosion-proof relationship.

BRIEF DESCRIPTION OF THE DRAWINGS

Other objects, features and advantages of the invention, together with its organization, construction and operation will be best understood from the following detailed description of the preferred embodiment of the invention, taken in conjunction with the accompanying drawings, on which.

DESCRIPTION OF THE PREFERRED EMBODIMENT

Figure 1:
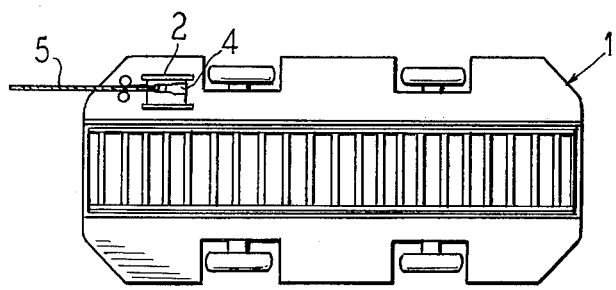
FIG. 1 is an illustration of how a mine cable reel is utilized on mobile machinery or other vehicles to accumulate the cable as the vehicle moves in the direction of the length of the cable and to "pay-out" the cable as the vehicle moves in the opposite direction.

FIG. 1 of the drawings illustrates a top view of a mining shuttle car generally referenced by the numeral 1. A mining shuttle car, because of the typically confined operating environment, is electrically powered and receives the required electrical energy from an energizing cable 5. As the shuttle car moves about, the energizing cable 5 is continuously reeled and unreeled on a cable reeling means 2, depending on the directional movement of the shuttle car. The cable reeling means 2, in addition to storing cable, maintains a constant tension on the cable 5 sufficient to rewind the cable 5 about the reeling means 2 as soon as slack develops in the cable as a result of the shuttle car moving in the direction of the length of the cable 5. The reverse occurs when the vehicle moves in a direction away from the length of the cable 5.

Figure 2:
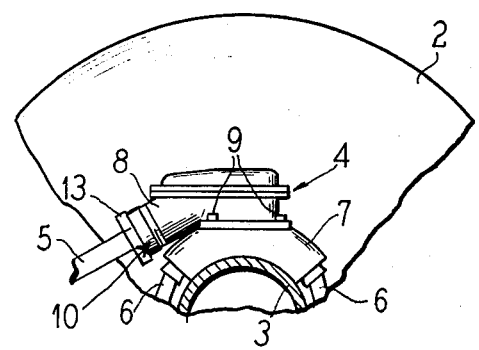
FIG. 2 is a pictorial view of an electrical cable reel connector constructed in accordance with the present invention, shown permanently attached to a sectional view of the cable reel.

A cable reel connector constructed in accordance with the present invention, indicated by the numeral 4, is shown attached to the cable reeling means 2, in FIG. 1. A clearer view of the orientation of the cable reel connector 4 on the cable reeling means 2 is shown in FIG. 2, wherein a receptacle housing section 7 of the cable reel connector 4 is shown mechanically secured to the cable reel drum 3 with a plurality of leads 6 extending therefrom, also shown in FIG. 6, to a slip-ring means (not shown) within the cylindrical cable reel drum 3.

Detachably connected, by a plurality of coupling bolts 9, to the receptacle housing section 7 is the plug housing section 8. The energizing cable 5 enters the plug housing section 8 and is secured thereto by a packing gland 12, as shown in FIG. 3, and a packing gland retaining nut 13 at the end 10 of the plug housing section 8, to permit the cable 5 to exit therefrom in a direction accepting the natural lay or wrap of stored cable about the cable reeling drum 3.

By attaching the receptacle housing section 7 securely to the cable reeling drum 3 and orienting the entrance of the energizing cable 5 into the plug housing section 8 through the packing gland 12 and packing gland retaining nut 13, in a manner to permit the cable to accept the natural wrap of cable around the cable reeling drum 3, the entire mine reel connector 4 functions as a strain-relief means preventing the various electrical connections from being pulled off or breaking as a result of the weight of the cable and continuous tension created thereon by the cable reeling means 2.

Figure 4:
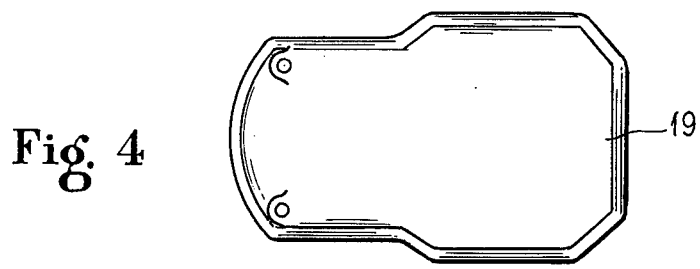
FIG. 4 is a top plan view of the plug housing cover.
Figure 3:
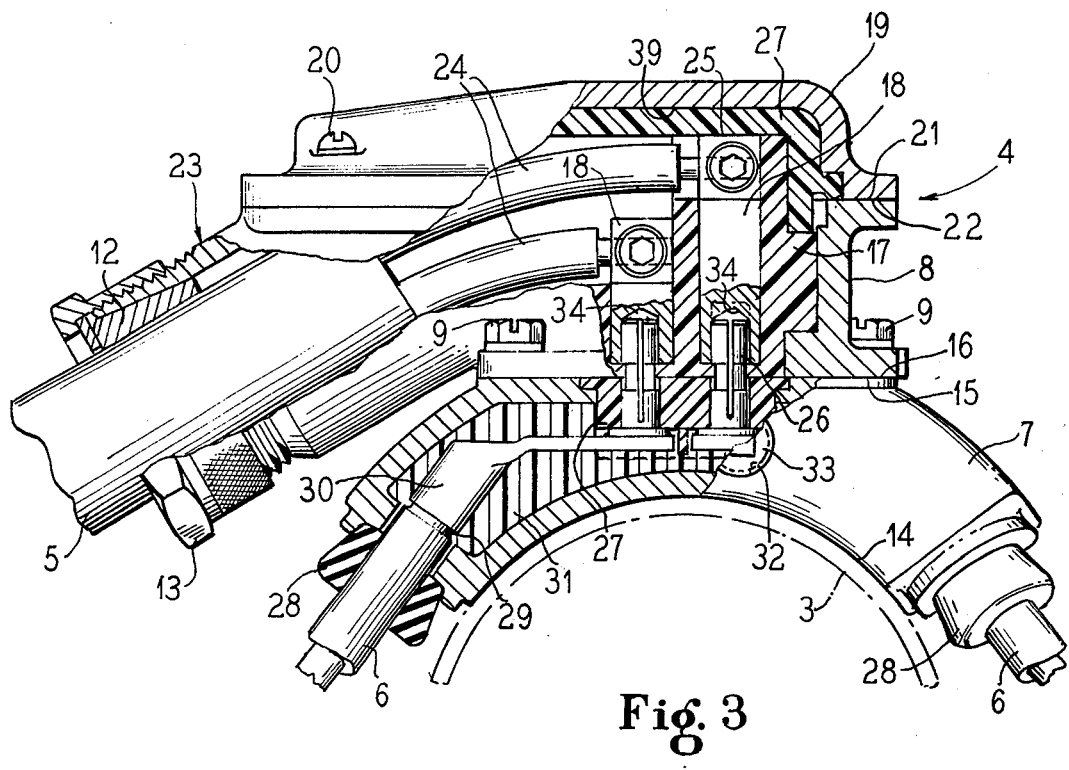
FIG. 3 is a cross-sectional view of an electrical cable reel connector, constructed in accordance with the present invention.

Referring to FIG. 3, the cable reel connector 4 is attached to the partially shown cable reeling drum 3 along the curved surface 14 of the receptacle housing section 7. The plug housing section 8 is detachably connected by a plurality of coupling bolts 9 along an outwardly flanged lower plane surface 15 to a mating outwardly flanged upper plane surface 16 of the receptacle housing section 7. The plug housing section 8 is enclosed by a detachably mounted plug housing cover 19 (FIG. 4) secured to the plug housing section 8 by a plurality of cover screws 20 along the partially outwardly flanged upper plane surface 21, shown in FIG. 5, of the plug housing section 8 and the outwardly flanged plane surface 22 of the plug housing cover 19.

An energizing cable 5 enters the plug housing section 8 through a rubber grommet packing gland 12 and a grommet nut 13. The grommet nut 13, as it is tightened, exerts a pressure on the packing gland 12, forcing the packing gland 12 to expand, thereby forming a tight, moisture-proof and explosion-proof seal between the energizing cable 5 and the plug housing section 8.

The energizing cable 5 leads into the plug housing section 8 at the angled extension 23 of the plug housing section 8 to permit the cable 5 to accept the natural lay or wrap of cable accumulated on the cable reeling drum 3. Thus, the cable 5 is not forced to make a sharp bend as was necessary in the prior art where an energizing cable entered a cable reeling drum at a 90° angle. It is also to be noted that by firmly sealing the juncture between the cable 5 and the plug housing section 8, any pulling force which the cable may exert is transferred to the plug housing section 8 and ultimately to the cable reeling means.

Located within the plug housing section 8 is an insulated contact insert 17 which has a plurality of receptacle conductor lugs 18 integrally formed and mounted therein.

In FIG. 3, the receptacle conductor lugs 18 are shown mechanically secured, thereby forming an electrical contact, to the plurality of conductor leads 24 of the energizing cable 5 adjacent the upper ends 25 of the lugs 18. When the contact insert 17 is urged into position within the plug housing section 8, the receptacle conductor lugs 18 will be in position with the receptacle socket ends 34, recessed from the plane surface 15 of the plug housing section 8, to receive the plug conductor lugs 26 protruding above the plane surface 16 of the receptacle housing section 7.

Figure 5:
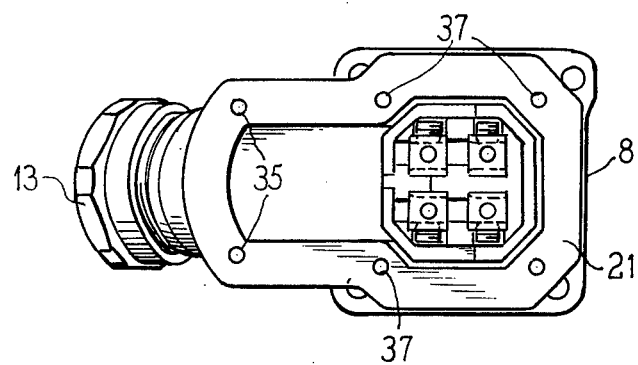
FIG. 5 is a top plan view of the plug with cover removed.
Figure 7:
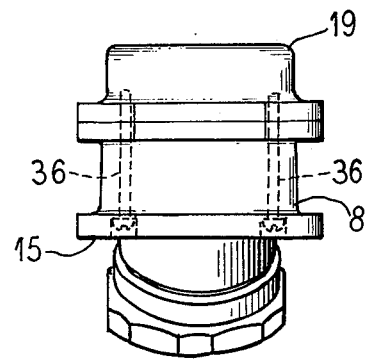
FIG. 7 is an end plan view of the plug assembly with cover attached constructed in accordance with the present invention.

The contact insert 17 is secured in position, after being urged into the mating cavity within the plug housing section 8 by a plug housing cover 19. The plug housing cover 19 is detachably mounted to the plug housing section 8 by a plurality of cover screws 20. Cover screws 20 extend downwardly through the cover 19 into thread holes 35, shown in FIG. 5, of the plug housing section 8, while, as shown in FIGS. 5 and 7, cover screws 36 extend from the plane surface 15 of and through the plug housing section 8 and finally into the threaded holes 37 of the plug housing cover 19.

A molded insulating means 27 is attached to the plug housing cover 19 along the internal side wall 39 which extends downwardly to mate with the contact insert 17, thereby functioning, when the plug housing cover 19 is attached to the plug housing section 8, to firmly position the contact insert 17 within the plug housing section 8.

Figure 6:
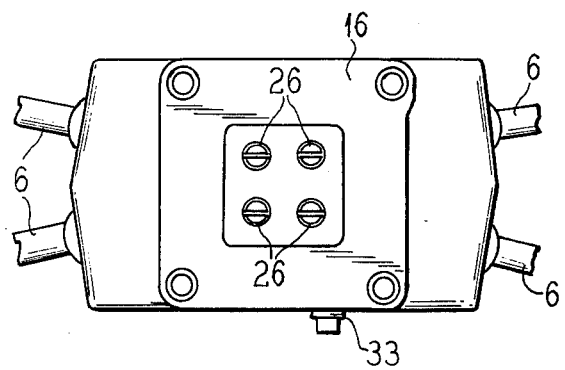
FIG. 6 is a top plan view of the receptacle.
Figure 8:
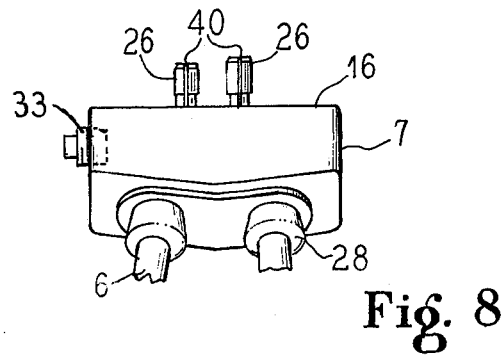
FIG. 8 is an end plan view of the receptacle constructed in accordance with the invention.

The receptacle housing section 7 contains a plurality of plug conductor lugs 26 positioned to protrude, in a corresponding configuration to that of receptacle conductor lugs 18 of the plug housing section 8, above the upper plane surface 16, as shown in FIGS. 8 and 6. The plug conductor lugs 26 are held in position by an insulated contact carrier 27 which forms part of the plane surface 16. A plurality of leads 6 connecting the slip-ring means, not shown, with the plurality of plug conductors 26, are each directed into the receptacle housing section 7 through conventional packing glands 28. The exposed conductive wire 29 of each lead 6 is mechanically crimped onto a conductive means 30 which is in turn attached to the lower end of the plug conductor lugs 26, thereby forming a current conducting path from the slip-ring means to the protruding plug conductor lugs 26 of the receptacle housing section 7. After the above conducting path is formed, the remaining area 31 within the receptacle housing section 7 is filled with a potting compound of a suitable material through an opening 32, shown closed in FIG. 8 by a pipe fitting plug 33.

The cylindrically shaped protruding plug conductor lugs 26 have a diameter slightly in excess of the diameter of the receptacle socket ends 34 of the receptacle conductor lugs 18. To accommodate the sliding engagement of the plug conductor lugs 26 and the receptacle socket ends 34 of the plug housing section 8, the plug conductor lugs are provided with a slit 40 extending partially down the length of each lug 26, which creates a resilient capability in each lug 26 to conform to the diameter of the receptacle socket end 34 when slidably engaged therewith.

Because of the confined area of useage, mating plane surfaces 22–21 and 15–16 have a sufficient length to provide the required surface area to cool and extinguish any flame or spark that might occur within the connector before it reaches the outer area, thereby preventing the ignition of any inflammable gas in the region of the connector. The mating plane surfaces 22–21 and 15–16 may also be machined and finished, and where the connector is to meet Bureau of Mines Standards, should be finished in accordance with these Standards, to provide smooth mating surfaces with no imperfections.

It may be seen from the foregoing that a simple and compact cable reel connector has been provided for mining shuttle cars and other mobile electrical components operating in confined areas, and that this connector consists essentially of a plug housing section and a receptacle housing section, one of which contains receptacle conductor lugs and the other of which contains plug conductor lugs. An energizing cable terminated at a cable reeling means by the cable reel connector, as described herein, may be readily inspected or replaced when and where necessary, and the connection may be readily made by engaging the receptacle conductor lugs of the plug housing section with the plug conductor lugs of the receptacle housing section by sliding the receptacle lugs inwardly along the plug lugs and then bolting the mating flanged surfaces together by the bolts.

The cable reel connector thus requires a minimum of space and provides a quick disconnection for removal of the energizing cable and is of such a design and construction that it may be used as a cable reel connector serving various power-consuming loads operating in confined areas containing explosive gases.

Although minor modifications might be suggested by those versed in the art, it should be understood that we wish to embody within the scope of the patent warranted hereon all such modifications as reasonably and properly come within the scope of our contribution to the art.

We claim as our invention:

1. An explosion-proof electrical cable reel connector of the type having a rotatable drum reeling means comprising:
   plug and receptacle housing sections separably connected to one another in explosion-proof assembly,
   said receptacle housing section being curved to a configuration generally complementary to that of the drum reeling means,
   and said plug housing section having an angulated configuration forming a cable entrance portion disposed in generally tangential relation to the receptacle housing and a coupling portion disposed radially to the receptacle housing,
   whereby the cable will be accepted in the natural lay or wrap of the cable around the reeling means.

2. An explosion-proof electrical cable reel connector according to claim 1, including a packing gland detachably mounted to said cable entrance of said plug housing, thereby permitting an energizing cable to extend therethrough and sealing said cable to said plug housing.

3. A separable connector for a cable reeling means comprising:
   an energizing electrical cable having a plurality of conductors,
   a cable reeling means having a rotatable cylindrical drum operable to selectively take-up and pay-out said energizing electrical cable thereon,
   a slip-ring means within said rotatable cylindrical drum operable to permit the transfer of electrical energy from said energizing electrical cable to the energy consuming load of a mine vehicle,
   a connector assembly including,
      a receptacle housing section having an internal cavity and a curved lower housing surface conforming in shape and attached to the cylindrical drum of said cable reeling means,
      a plug housing section having an angulated cable entrance leading into an internal cavity within said plug housing section,
      said sections each having a flat mating surface sized and configured to provide an explosion-proof joint, and further including mating male and female insulated contact means for effecting an electrical coupling, and a mechanical coupling means locking said sections together along said flat mating surfaces,
   whereby the cable may quickly be detached from the cable reeling means by uncoupling said housing sections.

4. A separable connector according to claim 3, comprising an insulated contact insert carried within said plug housing having an upper surface and a dimensional configuration corresponding with and conforming to said cavity of said plug housing section, and a plurality of current conducting receptacles electrically connected to the conductors of said energizing electrical cable, whereby when said insulated contact insert is removably urged into said cavity of said plug housing section, said current conducting receptacles assume a uniformly recessed position from said flat mating surface of said plug housing section.

5. A separable connector according to claim 4, comprising an insulated contact carrier having a dimensional configuration corresponding with and conforming to said cavity of said receptacle housing section, and a plurality of current conductor plugs electrically connected to said slip-ring means.

6. A separable connector according to claim 5, comprising a cover detachably mounted to said plug housing section, having a formed surface projecting within the cavity of said plug housing section and mating with said upper surface of said insulated contact insert whereby said insulated contact insert is securely positioned within said plug housing section.

7. A separable connector according to claim 6, and further characterized by said cover and said plug housing section having therebetween flat mating surfaces sized and configured to provide an explosion-proof joint.

8. An explosion-proof electrical cable reel connector, comprising:
   a plug section including,
      a plug housing having an internal cavity and a flange extending outwardly around the periphery of an upper and lower plane surface,
      an insulating contact insert carried within said plug housing having a formed upper surface and a plurality of current conducting receptacles mounted therein spaced inwardly from said lower plane surface of said plug housing,
      a cover detachably mounted to said plug housing having an inwardly projecting surface for abutting said formed upper surface of said contact insert to secure said contact insert within said plug housing,
      said cover having a flange extending outwardly around the periphery of said cover, complementary to said flanged upper plane surface of said plug housing, of sufficient length to cool and extinguish a flame within said plug housing when said surfaces are drawn into tight abutting engagement with each other,
      an electric energizing cable having conductors electrically connected with said current conducting receptacles of said insulated contact insert and leading from said plug housing,
      a packing gland detachably mounted to the end of said plug housing and permitting said cable to extend therethrough and sealing said cable to said plug housing,
   a receptacle section including,
      a receptacle housing,
      an insulating contact carrier within said receptacle housing, having a plurality of current conducting plugs protruding outwardly from said contact carrier electrically connected to a plurality of insulated conductors extending from said receptacle housing, through a plurality of packing glands, said receptacle housing having an outwardly extending flange extending around the periphery of an upper plane surface through which said conducting plugs protrude outwardly in an arrangement complementary to said recessed current conducting receptacles of said lower plane surface of said plug housing, said receptacles having a lower curved surface, permitting engagement with and permanent attachment to a rotatable drum of a cable reeling means, connecting means on said lower plane surface of said plug housing and on said upper plane surface of said receptacle housing to draw said surfaces together and maintain said surfaces in direct abutting engagement with each other, whereby said abutting flanged plane surfaces are of sufficient length to cool and extinguish a flame within said connector when said surfaces are drawn into tight abutting engagement with each other.

9. In a cable terminator means which includes,
a mobile mining vehicle,
an energizing cable,
a cable reeling means attached to said vehicle, having a cylindrical rotatable drum operable to selectively pay-out and retract said cable as said vehicle moves, respective to the length of said cable,
a slip-ring means within said cable reeling means operable to permit the rotating of said cable reeling means while transferring power to the power-consuming vehicle,
the improvement comprising:
a cable reel connector comprised of:
a plug section including
a plug housing having an internal cavity, an upper and lower plane surface with an outwardly extending flange around the periphery of each said upper and lower plane surface,
an insulating contact insert carried within said cavity of said plug housing, having a formed upper surface, a plurality of current conducting receptacles mounted therein and spaced inwardly from said lower plane surface of said plug housing,
a cover detachably mounted to said upper plane surface of said plug housing having an inwardly projecting member for abutting said formed upper surface of said contact insert to secure said contact insert within said internal cavity of said plug housing,
said cover having a flange extending outwardly around the periphery of said cover, complementary to said flanged upper plane surface of said plug housing section of sufficient length to cool and extinguish a flame within said plug section when said surfaces are drawn into tight abutting engagement with each other,
said energizing cable having conductors electrically connected with said current conducting receptacles of said plug section and leading therefrom,
a packing gland detachably mounted to the end of said plug housing and permitting said cable to extend therethrough and sealing said cable to said plug housing,
a receptacle section including a receptacle housing having an upper plane surface with an outwardly extending flange around the periphery thereof and a complementary curved surface opposite to said upper plane surface, permitting engagement with and permanent attachment to said cylindrical rotatable drum of said cable reeling means, an insulating contact carrier within said receptacle housing, having a plurality of current conducting plugs protruding outwardly from said upper plane surface of said receptacle housing in an arrangement complementary to said recessed current conducting receptacles of said plug housing, and electrically connected to a plurality of insulated conductors extending from said receptacle housing through a plurality of packing glands and electrically connected to said slip-ring means, means located on said lower plane surface of said plug housing and said upper plane surface of said receptacle housing to draw said surfaces together and maintain said surfaces in direct abutting engagement with each other, said flanged lower plane surface of said plug housing and said flanged upper plane surface of said receptacle housing of sufficient length to cool and extinguish a flame within said connector when said surfaces are drawn into tight abutting engagement with each other.

10. A power transfer means in combination with a mobile mining vehicle having a power-consuming load,
an energizing cable,
a rotatable cable reeling means attached to said mining vehicle having a rotatable cylindrical drum operable to selectively pay-out and retract said cable as said vehicle moves, respective to the length of said cable,
a slip-ring means within said cable reeling means operable to permit the rotating of said cable reeling means while transferring power to the power-consuming vehicle,
the improvement comprising:
a cable reel connector including
a plug section,
a plug housing having a flange extending outwardly around the periphery of an upper and lower plane surface and an internal cavity,
an insulating contact insert carried within said cavity of said plug housing having a formed upper surface, a plurality of current conducting receptacles mounted therein, spaced inwardly from said lower plane surface of said plug housing,
a cover detachably mounted to said upper plane surface of said plug housing having an inwardly projecting member for abutting said formed upper surface of said contact insert to secure said contact insert within said plug housing,
said cover having a flange extending outwardly around the periphery thereof, complementary to said flanged upper plane surface of said plug housing,
said energizing cable having conductors electrically connected with said current conducting receptacles of said insulating contact insert and leading from said plug section,
a packing gland detachably mounted to the end of said plug housing and permitting said cable to extend therethrough and sealing said cable to said plug housing, a receptacle section including, a receptacle housing having an outwardly extending flanged upper plane surface and a lower curved surface complementary to said rotatable cylindrical drum of said cable reeling means and permanently attached thereto, an insulating contact carrier within said receptacle housing, having a plurality of current conducting plugs protruding outwardly from said upper plane surface of said receptacle housing in an arrangement complementary to said recessed current conducting receptacles of said lower plane surface of said plug housing, and electrically connected to a plurality of insulated conductors extending from said receptacle housing through a plurality of packing glands and electrically connected to said slipring means, and a connecting means located on said flanged lower plane surface of said plug section and on said flanged upper plane surface of said receptacle section to draw said surfaces together to maintain said surfaces in direct abutting engagement with each other and of a sufficient length to cool and extinguish a flame within said connector when said surfaces are drawn into tight abutting engagement with each other.

* * * * *